United States Patent
Legrand

(10) Patent No.: US 9,445,542 B2
(45) Date of Patent: Sep. 20, 2016

(54) CUTTING WIRE FOR DEVICES SUCH AS EDGE TRIMMERS OR BRUSH CUTTERS

(75) Inventor: Emmanuel Legrand, Villeneuve (FR)

(73) Assignee: Speed France, Arnas (FR)

( * ) Notice: Subject to any disclaimer, the term of this patent is extended or adjusted under 35 U.S.C. 154(b) by 1392 days.

(21) Appl. No.: 10/556,269

(22) PCT Filed: May 14, 2004

(86) PCT No.: PCT/FR2004/001186
§ 371 (c)(1),
(2), (4) Date: Feb. 13, 2007

(87) PCT Pub. No.: WO2004/100646
PCT Pub. Date: Nov. 25, 2004

(65) Prior Publication Data
US 2007/0123092 A1    May 31, 2007

(30) Foreign Application Priority Data
May 14, 2003    (FR) ...................... 03 05770

(51) Int. Cl.
*A01D 34/416*    (2006.01)
*D01F 8/00*    (2006.01)
*D01F 8/12*    (2006.01)

(52) U.S. Cl.
CPC .................. *A01D 34/4168* (2013.01)

(58) Field of Classification Search
CPC .................. A01D 34/4168; Y10T 428/2929; Y10T 428/2933; Y10T 428/2938; Y10T 428/2964; Y10T 428/2969; Y10T 428/2973; Y10T 428/2978; Y10T 428/298; D01D 5/28; D01D 5/30; D01D 5/32; D01D 5/34; D01D 5/36
USPC ....... 428/373, 375, 378, 392, 395, 397, 400, 428/401; 30/276, 347
See application file for complete search history.

(56) References Cited

U.S. PATENT DOCUMENTS 2,434,533 A    1/1948    Wurzburger
3,066,366 A    12/1962    Wyckoff et al.
(Continued)

FOREIGN PATENT DOCUMENTS

AU    502953    8/1979
DE    1704986    6/1971
(Continued)

OTHER PUBLICATIONS

Polymer Data Handbook, Oxford University Press, "Nylon 6", pp. 180-185, 1999.*
(Continued)

*Primary Examiner* — Jennifer Chriss
*Assistant Examiner* — Frank Vineis
(74) *Attorney, Agent, or Firm* — Alston & Bird LLP

(57) ABSTRACT

The invention relates to a cutting wire (10) which is intended for a vegetation-cutting or -trimming device. The inventive wire comprises a core (12) which is surrounded by a skin (14). The invention is characterised in that: the core is made from a polyamide or a copolyamide; the skin is made from a polyamide or a copolyamide which is different from that of the core and which has a melting point above that of the core, such as to limit the occurrences of sticking, particularly caused by friction, in relation to the normal occurrences of sticking produced with the core material; and the outer surface of the skin is smooth. The risks of sticking and, in particular, of one wire sticking to another wire, under the effect of heating of different origins, regardless of whether the wire is in a coil or in strands, are significantly reduced or even eliminated without disturbing the production process or altering the performances of the wire.

3 Claims, 1 Drawing Sheet

(56) References Cited

U.S. PATENT DOCUMENTS

Figure 1:
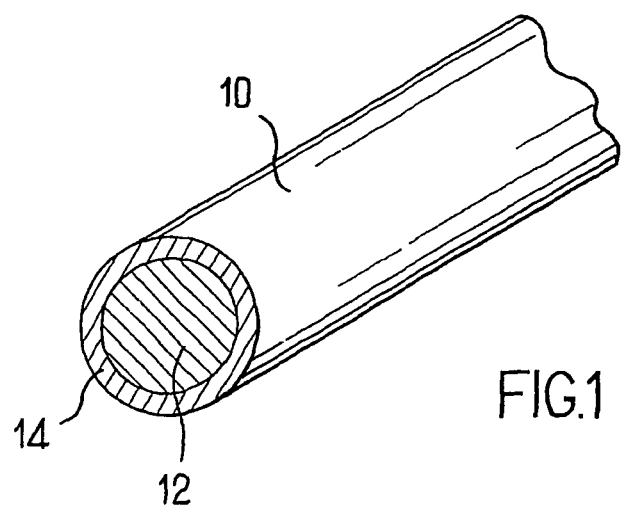

| | | | |
|---|---|---|---|
| 3,679,541 A * | 7/1972 | Davis | 428/373 |
| 3,708,967 A | 1/1973 | Geist et al. | |
| 3,720,055 A | 3/1973 | de Mestral et al. | |
| 3,826,068 A | 7/1974 | Ballas et al. | |
| 3,831,278 A * | 8/1974 | Voglesonger | 30/276 |
| 4,035,912 A | 7/1977 | Ballas et al. | |
| 4,043,037 A | 8/1977 | Okamoto et al. | |
| 4,054,992 A | 10/1977 | Ballas et al. | |
| 4,054,993 A | 10/1977 | Kamp et al. | |
| 4,062,114 A | 12/1977 | Luick | |
| 4,067,108 A | 1/1978 | Ballas | |
| 4,104,797 A | 8/1978 | Ballas | |
| 4,118,865 A | 10/1978 | Jacyno et al. | |
| 4,172,322 A | 10/1979 | Ballas | |
| 4,177,561 A | 12/1979 | Ballas | |
| 4,185,381 A | 1/1980 | Palmieri et al. | |
| 4,186,239 A * | 1/1980 | Mize et al. | 428/399 |
| 4,199,926 A | 4/1980 | Petty | |
| 4,209,902 A | 7/1980 | Moore et al. | |
| 4,238,866 A | 12/1980 | Taylor | |
| 4,271,595 A | 6/1981 | Rahe | |
| 4,282,653 A | 8/1981 | Comer et al. | |
| 4,301,642 A | 11/1981 | Thurber | |
| 4,335,510 A | 6/1982 | Close et al. | |
| 4,362,007 A | 12/1982 | Kennedy et al. | |
| 4,411,069 A | 10/1983 | Close et al. | |
| 4,685,279 A | 8/1987 | Gullett | |
| 4,726,176 A | 2/1988 | McGrew | |
| 4,756,146 A | 7/1988 | Rouse | |
| 4,835,867 A | 6/1989 | Collins et al. | |
| 4,852,258 A | 8/1989 | Foster | |
| D303,603 S | 9/1989 | Zimmerman | |
| 4,869,055 A | 9/1989 | Mickelson | |
| 4,905,465 A | 3/1990 | Jones et al. | |
| 5,048,278 A | 9/1991 | Jones et al. | |
| 5,049,347 A | 9/1991 | Magill et al. | |
| 5,220,774 A | 6/1993 | Harbeke et al. | |
| 5,276,968 A | 1/1994 | Collins et al. | |
| 5,398,416 A | 3/1995 | MacKey | |
| D358,535 S | 5/1995 | Skinner | |
| 5,411,805 A | 5/1995 | Magill | |
| 5,430,943 A | 7/1995 | Lee | |
| 5,433,006 A | 7/1995 | Taguchi | |
| D364,079 S | 11/1995 | Skinner | |
| 5,463,815 A | 11/1995 | Fogle | |
| 5,524,350 A * | 6/1996 | Boland | 30/347 |
| D376,078 S | 12/1996 | Skinner | |
| D376,739 S | 12/1996 | Skinner | |
| D379,052 S | 5/1997 | Skinner | |
| 5,687,482 A | 11/1997 | Behrendt | |
| 5,709,942 A * | 1/1998 | Leydon et al. | 428/375 |
| 5,713,191 A | 2/1998 | Welton | |
| 5,758,424 A | 6/1998 | Iacona et al. | |
| 5,761,816 A | 6/1998 | Morabit et al. | |
| 5,765,287 A | 6/1998 | Griffini et al. | |
| 5,836,227 A | 11/1998 | Dees, Jr. et al. | |
| 5,852,876 A | 12/1998 | Wang | |
| 5,852,879 A | 12/1998 | Schumaier | |
| 5,855,068 A | 1/1999 | Zilly et al. | |
| 5,887,348 A | 3/1999 | Iacona et al. | |
| 5,890,352 A | 4/1999 | Molina | |
| 5,896,666 A | 4/1999 | Iacona et al. | |
| 5,901,448 A | 5/1999 | Lingerfelt | |
| 5,979,064 A | 11/1999 | Kitz et al. | |
| 5,987,756 A | 11/1999 | Yates et al. | |
| 5,996,233 A | 12/1999 | Morabit et al. | |
| 6,018,840 A | 2/2000 | Guay et al. | |
| 6,032,442 A | 3/2000 | Paolo | |
| 6,035,618 A | 3/2000 | Fogle | |
| 6,045,911 A * | 4/2000 | Legrand et al. | 428/399 |
| 6,058,574 A | 5/2000 | Facey et al. | |
| 6,061,914 A * | 5/2000 | Legrand | 30/347 |
| 6,094,823 A | 8/2000 | Brown et al. | |
| 6,108,914 A | 8/2000 | Sheldon | |
| 6,119,350 A | 9/2000 | Sutliff et al. | |
| 6,124,034 A | 9/2000 | Proulx et al. | |
| RE36,940 E | 11/2000 | Fogle | |
| 6,148,523 A | 11/2000 | Everts et al. | |
| 6,161,292 A | 12/2000 | Morabit et al. | |
| 6,171,697 B1 * | 1/2001 | Legrand | 428/372 |
| 6,240,643 B1 | 6/2001 | Civalleri | |
| 6,279,235 B1 | 8/2001 | White, III et al. | |
| 6,314,848 B2 | 11/2001 | Morabit et al. | |
| 6,347,455 B2 | 2/2002 | Brant et al. | |
| 6,401,344 B1 | 6/2002 | Moore et al. | |
| 6,519,857 B1 | 2/2003 | Proulx et al. | |
| 6,560,878 B2 * | 5/2003 | Skinner et al. | 30/347 |
| 6,581,292 B2 | 6/2003 | Allis | |
| 6,601,373 B1 | 8/2003 | Legrand | |
| 6,630,226 B1 * | 10/2003 | Legrand | 428/143 |
| 6,668,462 B2 * | 12/2003 | Skinner et al. | 30/347 |
| 6,874,235 B1 * | 4/2005 | Legrand | 30/276 |
| 6,910,277 B2 | 6/2005 | Proulx et al. | |
| 6,912,789 B2 | 7/2005 | Price, III | |
| 6,928,741 B2 | 8/2005 | Proulx et al. | |
| 6,944,956 B1 | 9/2005 | Fogle | |
| 7,000,324 B2 | 2/2006 | Fogle | |
| 7,111,403 B2 | 9/2006 | Moore | |
| 7,210,231 B2 | 5/2007 | Legrand | |
| 7,257,898 B2 | 8/2007 | Iacona | |
| 7,370,424 B2 * | 5/2008 | Legrand | 30/347 |
| 7,543,387 B2 * | 6/2009 | Legrand | 30/276 |
| 7,607,233 B2 * | 10/2009 | Legrand | 30/347 |
| 2001/0014394 A1 | 8/2001 | Soane et al. | |
| 2001/0027610 A1 | 10/2001 | Wheeler et al. | |
| 2002/0023356 A1 | 2/2002 | Skinner et al. | |
| 2002/0028857 A1 * | 3/2002 | Holy | 523/124 |
| 2002/0157200 A1 | 10/2002 | Galantai | |
| 2003/0033718 A1 | 2/2003 | Alliss | |
| 2003/0157322 A1 * | 8/2003 | Boyd | D01F 8/04 428/373 |
| 2003/0200662 A1 | 10/2003 | Moore | |
| 2004/0128840 A1 | 7/2004 | Proulx et al. | |
| 2005/0028390 A1 * | 2/2005 | Legrand | 30/347 |
| 2005/0081389 A1 | 4/2005 | Legrand | |
| 2005/0172501 A1 | 8/2005 | Fogle | |
| 2005/0188547 A1 | 9/2005 | Legrand | |
| 2005/0229402 A1 | 10/2005 | Iacona | |
| 2007/0123092 A1 | 5/2007 | Legrand | |

FOREIGN PATENT DOCUMENTS

| | | |
|---|---|---|
| DE | 43 21 650 C1 | 10/1994 |
| DE | 4321650 | 10/1994 |
| DE | 196 32 721 | 2/1998 |
| DE | 19817883 | 11/1999 |
| EP | 0824854 | 2/1998 |
| EP | 0867108 | 2/1998 |
| EP | 0 867 108 A1 | 9/1998 |
| EP | 01057396 | 12/2000 |
| EP | 1088476 | 4/2001 |
| EP | 1129609 | 9/2001 |
| FR | 1319050 | 2/1963 |
| FR | 2658698 | 8/1991 |
| FR | 2793648 | 11/2000 |
| JP | 63059812 | 3/1988 |
| JP | 7184446 | 7/1995 |
| NL | 8302111 | 1/1985 |
| WO | WO 97/19584 | 6/1997 |
| WO | WO 97/43469 | 11/1997 |
| WO | WO 99/40773 | 8/1999 |

OTHER PUBLICATIONS

A. Blaga, CBD154. Plastics, Oct. 1, 1973, Canadian Building Digest, Canada.

International Search Report for PCT Application No. PCT/FR2004/001186; Filed May 14, 2004; Date of Completion Dec. 7, 2004; Date of Mailing Dec. 17, 2004.

Written Opinion for PCT Application No. PCT/FR2004/001186; Filed May 14, 2004; Date of Completion Dec. 7, 2004; Date of Mailing Dec. 17, 2004.

* cited by examiner

CUTTING WIRE FOR DEVICES SUCH AS EDGE TRIMMERS OR BRUSH CUTTERS

This present invention generally concerns the wires employed to trim or cut back vegetation, and in particular wires intended to be fitted to the rotating heads of motor-driven appliances such as brush-clearing or edge-trimming devices.

Conventionally, such a wire is manufactured in the form of a single filament in synthetic material, typically of polyamide.

These cutting wires have been significantly improved in recent years resulting in greater resilience, greater cutting efficiency, and reduced aerodynamic noise in operation.

Furthermore, in order to raise the cutting efficiency, and as a corollary obtains a greater resilience of the cutting wires, the current trend is to turn the rotating heads of the appliances at increasingly high speeds (typically up to 10,000 revolutions per minute).

In such circumstances however, both the traditional wires and the more advanced wires have a tendency to exhibit a sticking phenomenon.

In fact, the vibration or other forces then applied to the wire during rotation of the head, and the stresses imparted when the wire strikes the vegetation, create a degree of rubbing between the adjacent sections of wire which is sufficiently great to heat the wire at its surface, and give rise to sticking.

This phenomenon occurs in particular in appliances where the wire is on a reel and, at the very least, significantly interferes with the automatic unwinding of the wire.

Whatever its origin, such sticking manifests itself as a more or less significant adhesion of the surface of the wire to another part or strand of wire. In extreme cases, the wires stick together permanently, and the reel (or the wire strands) is rendered useless.

In less serious cases of sticking, it is possible to effect the unsticking of the wire manually, after first gaining access to the reel within the cutting head. However this is very fiddly and causes the operator to lose a lot of time. Moreover, this manual unsticking may lead to deforming or tearing of the surface parts of the wire, making it more fragile.

Sticking problems can also occur not only wire against wire, but also during the contact of the wire with other components of the appliance (walls of the reel, wire-section passages, wire blockers, etc.), with various associated disadvantages.

In the past, attempts have been made to solve these problems of sticking wire. In particular, document EP 0 867 108 A1, in the name of the Applicant, describes a composite cutting wire with a grainy or roughened coating in the form of mineral particles. Cutting is thus improved and the sticking phenomena are limited.

This wire calls for a particular production process, and the grainy coating can be a source of noise in operation.

For its part, document DE 43 21 650 C1 describes a composite cutting wire with a skin of partially reticulated polyethylene, so that it has an indeterminate melting point, thereby limiting the sticking phenomena. However, reticulation requires an additional step (irradiation) in the manufacturing process, and the use of two different synthetic materials proves to be problematical.

This present invention aims to reduce or to circumvent these drawbacks of the current designs, and to propose a cutting wire which, while exhibiting the usual properties of cutting wires in polyamide material, and not requiring any particular operations in the manufacturing process in relation to a composite wire extrusion or drawing process, has improved properties regarding the sticking phenomenon.

To this end, it proposes a cutting wire for a brush cutting or trimming appliance which includes a core covered with a skin, characterised in that the core is made from a polyamide or a copolyamide material, in that the skin is made from a polyamide or copolyamide material that is different from that of the core and whose melting point is above that of the core, so as to limit the sticking phenomenon, especially caused by rubbing, in relation to those that would be obtained with the material of the core, and in that the outer surface of the skin is smooth.

Certain preferred but non limiting aspects of this cutting wire are as follows:
- the melting point of the core is between about 190° C. and 220° C.,
- the core is made of polyamide 6,
- the core is made of copolyamide,
- the melting point of the skin is between about 250 and 300° C.,
- the skin is made from polyamide 66,
- the skin is made from copolyamide 6/66,
- the skin is made from a mixture of polyamide or copolyamide and an amorphous aromatic polyamide,
- the thickness of the skin is between about 0.5% and 25% of the mean radius of the wire.

Figure 2A:
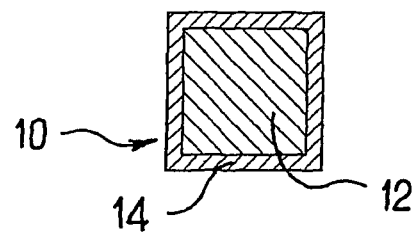
Figure 2B:
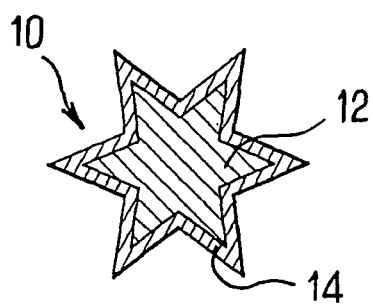
Figure 2C:
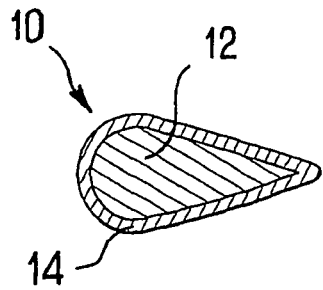

Other aspects, aims and advantages of this present invention will appear more clearly on reading the following detailed description of one preferred form of implementation of the latter, which is given as a non-limited example and with reference to the appended drawings, in which:

FIG. 1 is a view in perspective of a section of cutting wire according to the invention, and FIGS. 2a to 2c are views in section of three cutting wires with of other forms of transverse section according to the invention.

To begin with, FIG. 1 represents a cutting wire 10 for a brush-trimmer, edge-trimmer or similar, which consists of a core 12 surrounded by a skin 14.

In this present example, the wire has a circular transverse section, where the skin 14 in this section constitutes a sheath which is concentric with the core 12 and entirely surrounding the latter. The surface of the skin 14 is smooth, with nothing of a grainy nature. However, the adjective "smooth" does not exclude the existence of surface features such as ribs, bumps, grooves, variations of section, teeth, etc. on a coarser scale, with the aim of improving the performance of the wire in operation (cutting efficiency, diminution of the noise, penetration in the air, etc.).

The core 12 is made from a polyamide or copolyamide material, and preferably from a polyamide used conventionally for the creation of single-material, single-filament cutting wires. Typically, use is made of a polyamide 6 whose melting point is about 220° C. In a variant, it can be a copolyamide 6/66 whose melting point is typically between 190° C. and 220° C.

The skin 14 is made from a polyamide or copolyamide material other than that of the core, and chosen so that its melting point is higher than that of the core. Preferably, a polyamide 66 is used, with a melting point of about 255° C., or again a copolyamide 6/66 with a melting point of between 250° C. and 270° C.

In a variant, one can make use of a polyamide 66 which has been additive-treated with an amorphous aromatic polyamide such as that marketed by the BASF company in Germany under the name of KR4351. In this case, by varying the proportion of this additive (typically between 0 and 20% of the total weight), it is possible to adjust the melting point of this mixture to a value between 255° C. and about 300° C.

Advantageously, the skin has a thickness of between about 0.5% and 25% of the radius of the wire, or again, in the case of a wire with a non-circular section, as will be seen later, of the mean radius (MR) of the latter, calculated as:

$$MR = \sqrt{\frac{S}{\pi}}$$

where S is the area of the transverse section of the wire and π=3.1416.

A cutting wire according to the invention is created by conventional co-extrusion techniques, presenting no difficulty to the professional engineer.

In the case of a wire of circular section, a wire according to the invention can be manufactured with a diameter that is typically between 1.2 mm and 5 mm, depending on the application envisaged.

Tests

A comparison has been effected between the behaviour, in terms of sticking, of a traditional cutting wire in polyamide 6 with a diameter of 3 mm, with a cutting wire of the same external diameter created in accordance with the invention, with a core 12 in polyamide 6 with a diameter of 2.8 mm covered with a skin with a thickness of 0.2 mm and made of polyamide 66.

The tests were performed with a bought-in automatic reel-unwinding machine, with a speed of rotation of the cutting head of 7500 revolutions per minute.

It was observed that all of the sticking phenomena of adjacent sections of wire disappeared during long use and/or in difficult working conditions.

In particular, the trapping of wire due to sticking had totally disappeared using the wire according to the invention, even after prolonged use of some hours.

As shown in FIGS. 2a to 2c, it is possible to implement the invention with cutting wires of any section, in a reel or in strands. In these figures, as in FIG. 1, the core of the wire 10 is designated by reference 12, while its skin is designated by reference 14.

Thus FIG. 2a shows a wire of generally square section, FIG. 2b a wire of star-shaped section, and FIG. 2c a wire with a section like an aircraft wing.

Of course, the invention also applies to wires of non-uniform section, such as wires with teeth to facilitate the cutting of vegetation, having projections and/or indentations intended for the reduction of noise of aerodynamic origin during operation, or indeed to twisted wires, meaning wires with a constant or generally constant transverse section which turns as one moves along the wire.

Naturally, many other variants and modifications can be applied to the invention.

In the first place, it is possible to arrange that the skin 14 does not completely surround the core 12, and/or that it is of variable thickness.

In the event that the skin does not completely surround the core, it still occupies a sufficient area so that, when two sections of wire are in contact with each other, this contact is mostly via the material of the skin. The risks of sticking with the material of the core are thus marginalised.

Secondly, it is possible to arrange that the core is not formed from one single-material filament, but rather of a bundle of filaments of smaller section, or again of a multi-layer structure.

Thirdly, it is possible to add to the material of the core or of the skin any additive or loading product for other purposes, as long as the relative properties of the core and the skin in terms of resistance to sticking remain within the framework of this present invention.

The invention claimed is:

1. A cutting wire for a brush or edge cutter or trimmer, having a diameter of about 1.2 to about 5.0 millimeters and configured for cutting vegetation, comprising a core coated by a skin, wherein the core consists of polyamide 6, wherein the skin consists of polyamide 66 or polyamide 66 that is treated with an amorphous aromatic polyamide additive and whose melting point is above that of the core so as to limit sticking phenomena in relation to those which would be obtained using the material of the core, and wherein the outer surface of the skin is smooth.

2. A cutting wire according to claim 1, wherein the thickness of the skin is between about 0.5% and 25% of the mean radius of the wire.

3. A cutting wire for a brush or edge cutter or trimmer, having a diameter of about 1.2 to about 5.0 millimeters and configured for cutting vegetation, consisting of a core coated by a skin, wherein the core consists of polyamide 6, wherein the skin consists of polyamide 66 or polyamide 66 that is treated with an amorphous aromatic polyamide additive and whose melting point is above that of the core so as to limit sticking phenomena in relation to those which would be obtained using the material of the core, and wherein the outer surface of the skin is smooth.

\* \* \* \* \*